United States Patent [19]

Kataoka et al.

[11] Patent Number: 4,678,047

[45] Date of Patent: Jul. 7, 1987

[54] ARTICLE SUPPLY FOR A COMBINATORIAL WEIGHING MACHINE

[75] Inventors: Koichi Kataoka, Shiga; Takashi Kabumoto, Mukou, both of Japan

[73] Assignee: Kabushiki Saisha Ishida Koki Seisakusho, Kyoto, Japan

[21] Appl. No.: 847,092

[22] Filed: Apr. 2, 1986

Related U.S. Application Data

[63] Continuation of Ser. No. 572,315, Jan. 20, 1984, abandoned.

[30] Foreign Application Priority Data

Jan. 20, 1983 [JP] Japan ................... 58-008320

[51] Int. Cl.⁴ .................. G01G 19/22; G01G 21/28
[52] U.S. Cl. ........................... 177/1; 177/25; 177/58
[58] Field of Search ................. 177/1, 25, 58, 59

[56] References Cited

U.S. PATENT DOCUMENTS

| | | |
|---|---|---|
| 379,231 | 3/1888 | Lamb .................. 177/91 X |
| 419,948 | 1/1890 | Henry .................. 177/91 |
| 3,022,843 | 2/1962 | Watson et al. .................. 177/98 |
| 3,734,215 | 5/1973 | Smith .................. 177/99 X |
| 3,783,957 | 1/1974 | Borghi .................. 177/105 X |
| 4,398,612 | 8/1983 | Mikami et al. .................. 177/25 |
| 4,418,771 | 12/1983 | Henry et al. .................. 177/103 X |
| 4,437,527 | 3/1984 | Omae et al. . |
| 4,446,938 | 5/1984 | Kawanishi . |
| 4,454,924 | 6/1984 | Minamida . |
| 4,538,693 | 9/1985 | Klopfenstein et al. .................. 177/59 X |
| 4,549,619 | 10/1985 | Fujiwara .................. 177/25 |
| 4,610,322 | 9/1986 | Sugioka et al. .................. 177/1 X |

FOREIGN PATENT DOCUMENTS

| | | |
|---|---|---|
| 0063042 | 10/1982 | European Pat. Off. . |
| 132108 | 1/1985 | European Pat. Off. .................. 177/90 |
| 1022813 | 1/1958 | Fed. Rep. of Germany .................. 177/105 |
| 2621477 | 11/1977 | Fed. Rep. of Germany .................. 177/105 |
| 56-126719 | 5/1981 | Japan .................. 177/1 |
| 57-131020 | 8/1982 | Japan . |
| 2060910 | 5/1981 | United Kingdom . |
| 2074329 | 10/1981 | United Kingdom . |

*Primary Examiner*—George H. Miller, Jr.
*Attorney, Agent, or Firm*—Staas & Halsey

[57] ABSTRACT

A method and apparatus for supplying articles in an automatic weighing system in which a number of weighing hoppers are arranged in sets composed of two weighing hoppers each. The weighing hoppers in each set provide weight values indicative of the weight of the articles contained in the hoppers, and a combinatorial computation is performed based on the weight values. Those of the weighing hoppers that correspond to an optimum combination of the weight values are selected and are caused to discharge their articles. These weighing hoppers are resupplied with articles from pool hoppers, with one pool hopper being provided for each set of weighing hoppers.

10 Claims, 16 Drawing Figures

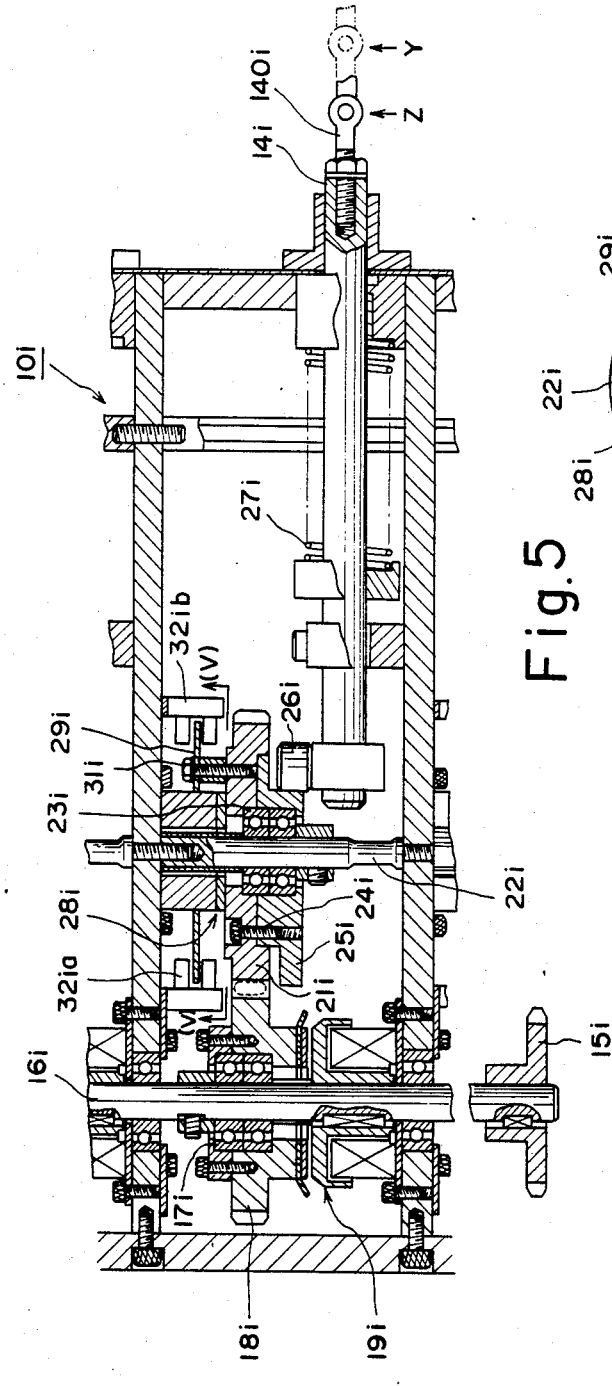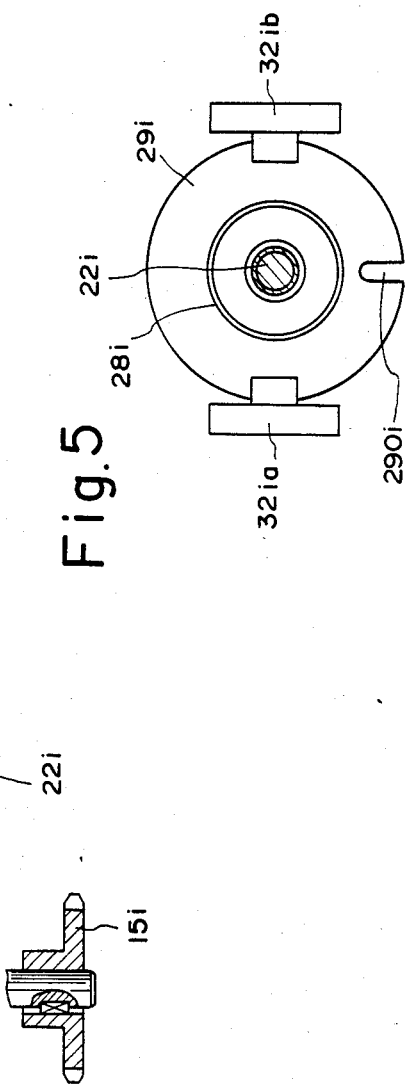

Fig. 8

| Pattern \ Weighing Machine | 2₁ₐ | 2₁ᵦ | 2₂ₐ | 2₂ᵦ | 2₃ₐ | 2₃ᵦ | 2₄ₐ | 2₄ᵦ | 2₅ₐ | 2₅ᵦ | 2₆ₐ | 2₆ᵦ | Pattern Doubling ? |
|---|---|---|---|---|---|---|---|---|---|---|---|---|---|
| 1 | O | | | | | | | | | | | | |
| 2 | | O | | | | | | | | | | | |
| 3 | O | O | | | | | | | | | | | YES |
| 4 | | | O | | | | | | | | | | |
| 5 | O | | O | | | | | | | | | | |
| 6 | | O | O | | | | | | | | | | |
| 7 | O | O | O | | | | | | | | | | YES |
| 8 | | | | O | | | | | | | | | |
| 9 | O | | | O | | | | | | | | | |
| 10 | | O | | O | | | | | | | | | |
| 11 | O | O | | O | | | | | | | | | YES |
| 12 | | | O | O | | | | | | | | | YES |
| 13 | O | | O | O | | | | | | | | | YES |
| 14 | | O | O | O | | | | | | | | | YES |
| 15 | O | O | O | O | | | | | | | | | YES |
| 16 | | | | | O | | | | | | | | |
| 17 | O | | | | O | | | | | | | | |
| 18 | | O | | | O | | | | | | | | |
| 19 | O | O | | | O | | | | | | | | YES |
| 20 | | | O | | O | | | | | | | | |
| ⋮ | | | | | | | | | | | | | |
| 2045 | O | | O | O | O | O | O | O | O | O | O | | YES |
| 2046 | | O | O | O | O | O | O | O | O | O | O | | YES |
| 2047 | O | O | O | O | O | O | O | O | O | O | | | YES |
| 2048 | | | | | | | | | | | | O | |
| 2049 | O | | | | | | | | | | | O | |
| 2050 | | O | | | | | | | | | | O | |
| 2051 | O | O | | | | | | | | | | O | YES |
| ⋮ | | | | | | | | | | | | | |
| 4091 | O | O | | O | O | O | O | O | O | O | O | O | YES |
| 4092 | | | O | O | O | O | O | O | O | O | O | O | YES |
| 4093 | O | | O | O | O | O | O | O | O | O | O | O | YES |
| 4094 | | O | O | O | O | O | O | O | O | O | O | O | YES |
| 4095 | O | O | O | O | O | O | O | O | O | O | O | O | YES |

Fig. 9

| $X_{1a}$ | $X_{1b}$ | $X_{2a}$ | $X_{2b}$ | $X_{3a}$ | $X_{3b}$ | $X_{4a}$ | $X_{4b}$ | $X_{5a}$ | $X_{5b}$ | $X_{6a}$ | $X_{6b}$ |
|---|---|---|---|---|---|---|---|---|---|---|---|
| H | L | L | H | L | L | L | H | L | L | H | L |

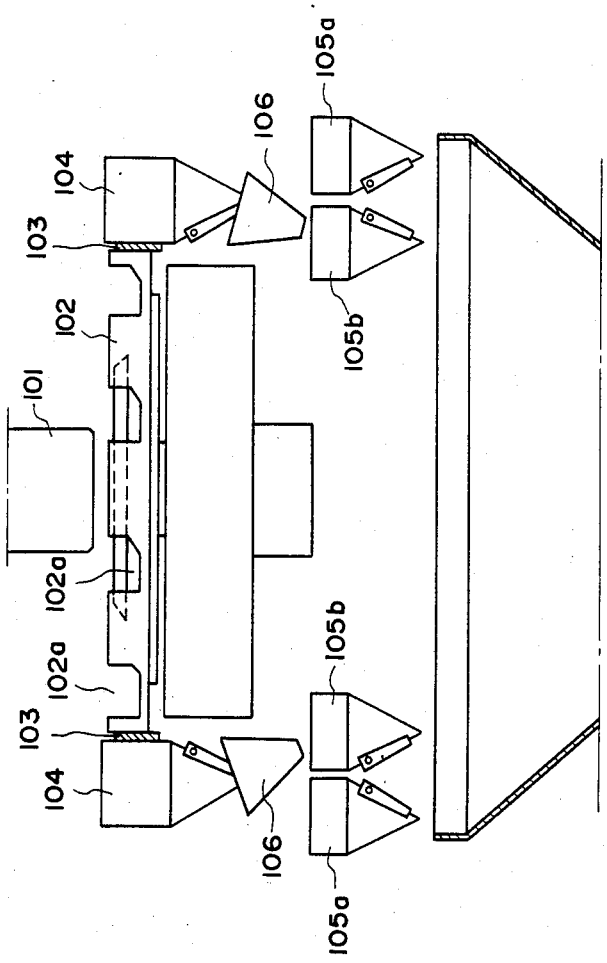

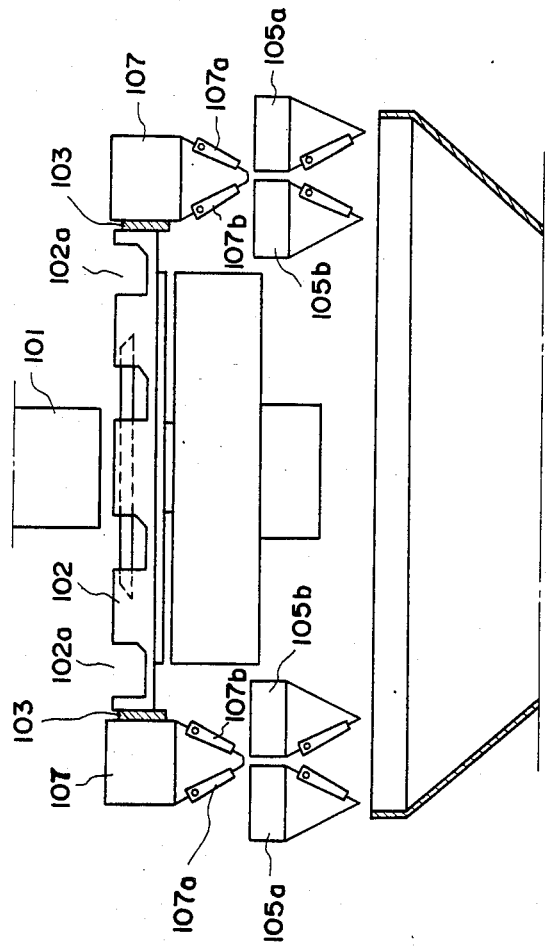

ARTICLE SUPPLY FOR A COMBINATORIAL WEIGHING MACHINE

This is a continuation of co-pending application Ser. No. 572,315 filed on Jan. 20, 1984 now abandoned.

CROSS-REFERENCE TO RELATED APPLICATIONS

This application is related to U.S. application Ser. No. 414,648, filed Sept. 3, 1982, now U.S. Pat. No. 4,454,924; and U.S. application Ser. No. 621,386 filed June 18, 1984, both of which are assigned to the Assignee of the subject application.

BACKGROUND OF THE INVENTION

This invention relates to a method and apparatus for supplying articles to be weighed in an automatic weighing system of the combinatorial weighing type.

There is a combinatorial weighing-type automatic weighing system known in the art for automatically obtaining a batch of articles having a weight equal or closest to a target weight. A combinatorial-type automatic weighing system in a practical use has a number of weighing machines each of which is provided with a weighing hopper. In carrying out weighing with such a system, the weighing hoppers are supplied with articles to be weighed, the weight of the articles in each weighing hopper is detected by the associated weighing machine, combinations of the weight values obtained from each of the weighing machines, as well as the total weight of each combination, are computed, a combination (referred to as the "optimum combination") whose total weight is equal or closest to a target weight is selected from among the available combinations, and only the articles in the weighing hoppers of the weighing machines corresponding to the selected optimum combination, are discharged from these weighing hoppers, whereby there is obtained a batch of articles the weight whereof is equal or closest to the target weight.

The automatic weighing system of the above-described type is equipped with a plurality of pool hoppers corresponding to and disposed above the weighing hoppers. The weighing hoppers which have discharged their articles, namely the weighing hoppers corresponding to the optimum combination, are immediately resupplied with articles by the corresponding pool hoppers, so that these weighing hoppers will be ready for the next weighing cycle. Further, the pool hoppers which are left empty by supplying their articles to the weighing hoppers, are themselves resupplied with articles distributed by a device which retains a supply of the articles.

However, with the conventional method and apparatus for supplying articles described above, it is necessary that the number of pool hoppers be the same as the number of weighing machines (weighing hoppers), and that there be provided supply means such as vibratory troughs for supplying each and every pool hopper with articles. Accordingly, the conventional automatic weighing apparatus has a large number of component parts, is complex in construction and high in cost.

SUMMARY OF THE INVENTION

An object of the present invention is to provide a method and apparatus for supplying articles in an automatic weighing system, wherein it is possible to employ a number of pool hoppers and, hence, a number of supply means for supplying the pool hoppers with articles, which is half the number of weighing machines (weighing hoppers), thereby reducing the number of component parts as well as the cost of manufacture without diminishing the number of weighing machines or, in other words, while maintaining a prescribed weighing accuracy.

According to the present invention, the foregoing object is attained by providing a method of supplying articles in an automatic weighing system in which a number of weighing hoppers are arranged in sets composed of two weighing hoppers each. The method includes performing a combinatorial computation based on the values obtained from the weighing hoppers and, after articles have been discharged from those weighing hoppers that correspond to an optimum combination of the weight values, resupplying these weighing hoppers with articles from pool hoppers, with one pool hopper being provided for each set of weighing hoppers.

Further, the present invention provides an apparatus for supplying articles in an automatic weighing system comprising plural weighing hopper sets each of which includes a pair of weighing hoppers attached to respective ones of plural weighing machines, each weighing hopper having a gate, a pool hopper disposed above the pair of weighing hoppers in each weighing hopper set, each pool hopper having a gate, a director chute disposed between each weighing hopper set and the pool hopper corresponding thereto in such a manner as to be tiltable toward either of the pair of weighing hoppers in the weighing hopper set, drive means for operating the gate of each weighing hopper, the gate of each pool hopper and each director chute, and control means for performing a combinatorial computation based on weight values from the plurality of weighing machines, and for controlling operation of the drive means.

In another embodiment of the present invention, there is provided an apparatus for supplying articles in an automatic weighing system comprising plural weighing hopper sets each of which includes a pair of weighing hoppers attached to respective ones of plural weighing machines, each weighing hopper having a gate, a pool hopper disposed above the pair of weighing hoppers in each weighing hopper set, each pool hopper having two gates facing corresponding ones of the weighing hoppers in the pair of weighing hoppers, drive means for operating the gate of each weighing hopper and the two gates of each pool hopper, and control means for computing combinations based on the weighing values from the plurality of weighing machines, and for controlling operation of the drive means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 through 9 illustrate a first embodiment of an apparatus for supplying articles in an automatic weighing system according to the present invention, in which:

FIG. 1 is a perspective view of a principal portion of the apparatus;

FIG. 2 is a side view of the left side of the apparatus;

FIG. 3 is a side view of the right side of the apparatus;

FIG. 4 is an enlarged sectional view of a principal portion of a drive apparatus;

FIG. 5 is a longitudinal sectional view taken along line V—V of FIG. 4;

FIG. 6 is a block diagram of a control apparatus;

FIG. 7 is a flowchart for the processing for an article supply operation;

FIG. 8 is a table for explaining combination patterns generated by the control apparatus of FIG. 6; and FIG. 9 is an explanatory view of discharge flags generated by the control apparatus of FIG. 6.

FIG. 10 is a longitudinal sectional view of an application of the apparatus of the first embodiment.

FIGS. 11 through 15 illustrate a second embodiment of the supply apparatus of the present invention, in which:

FIG. 11 is a perspective view of a principal portion of the apparatus;

FIG. 12 is a side view of the left side of the apparatus;

FIG. 13 is a side view of the right side of the apparatus;

FIG. 14 is a block diagram of a control apparatus; and

FIG. 15 is a flowchart for the processing for an article supply operation.

FIG. 16 is a longitudinal sectional view of an application of the apparatus of the second embodiment.

DESCRIPTION OF THE PREFERRED EMBODIMENTS

Figure 1:
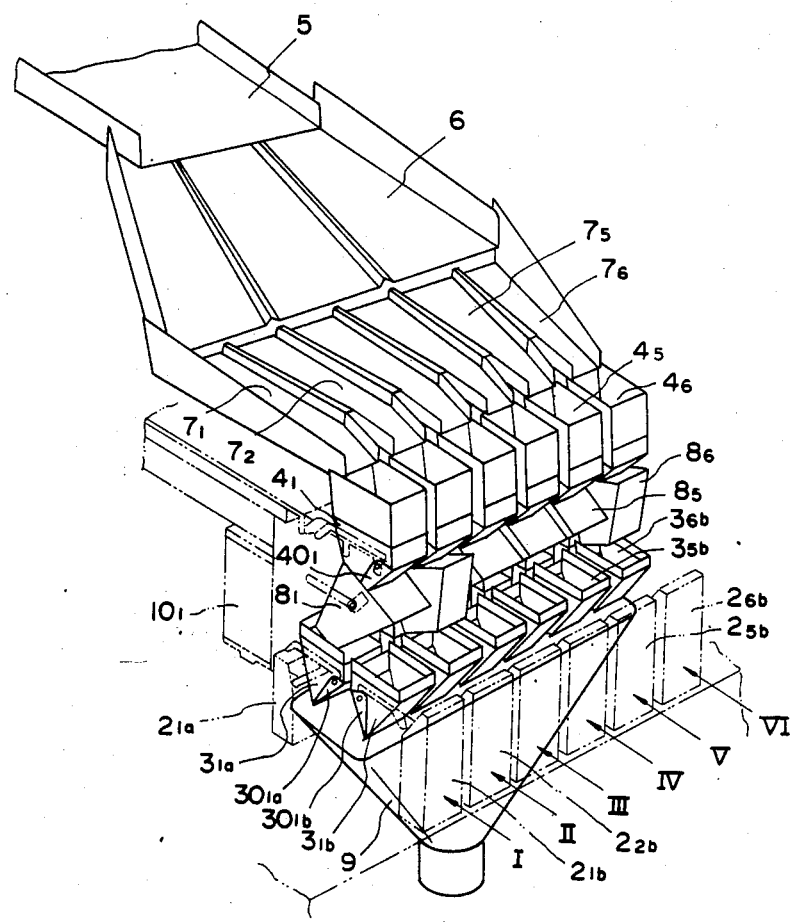
Figure 2:
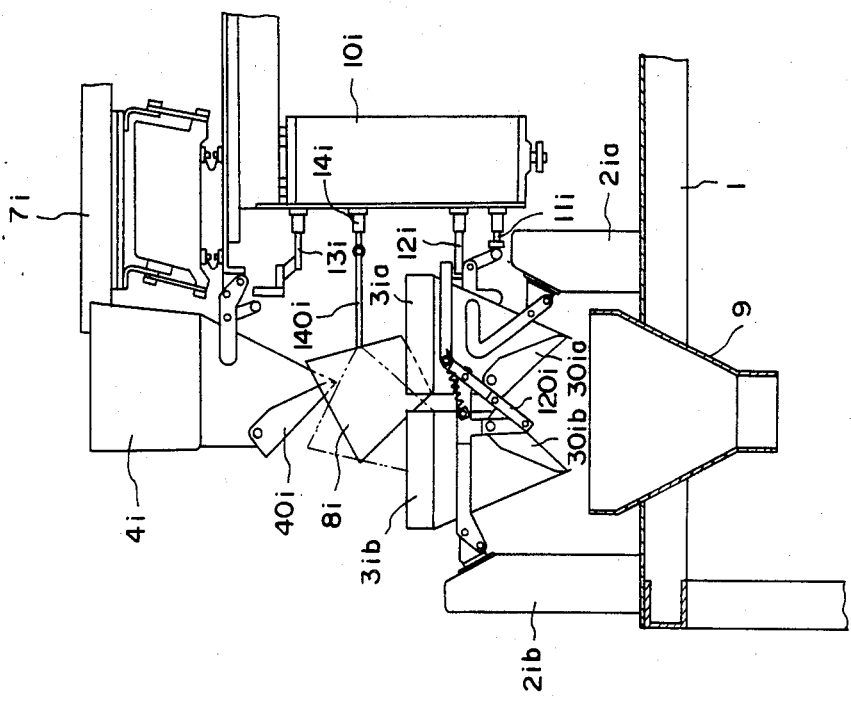
Figure 3:
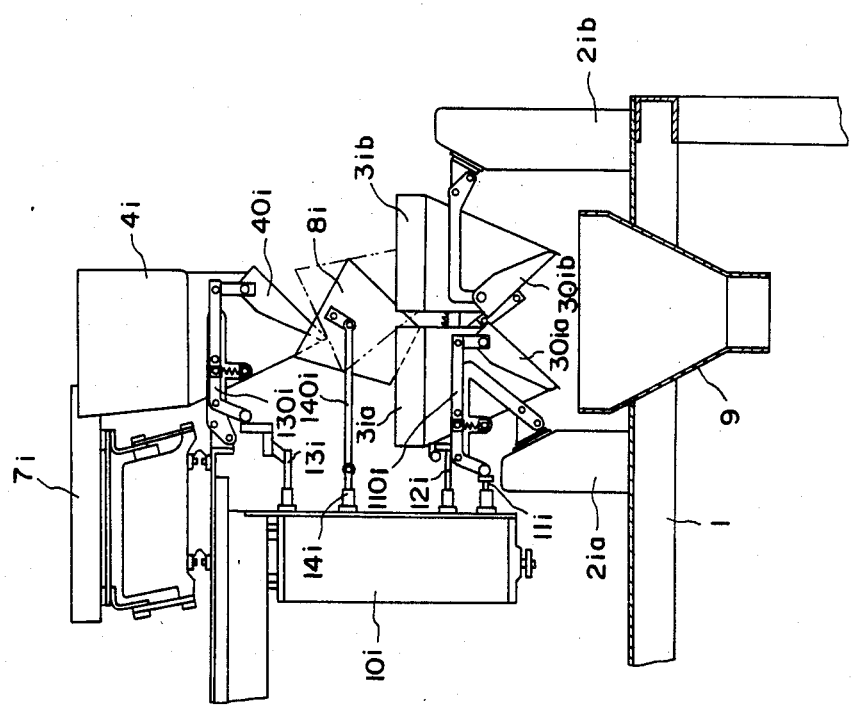

With reference first being had to FIGS. 1 through 3, an article supply apparatus according to a first embodiment of the present invention includes a row of first weighing machines $2_ia$ and a row of second weighing machines $2_ib$ mounted on a base 1. Each pair of opposing weighing machines $2_ia$, $2_ib$ constitutes one set, of which there are six sets I through VI. The subscript "i" indicates the number of the set, where $i = 1 \sim 6$. The first and second weighing machines $2_ia$, $2_ib$ in each set are equipped with respective first and second weighing hoppers $3_ia$, $3_ib$. The first and second weighing hoppers $3_ia$, $3_ib$ in each set oppose each other and are disposed closely together.

Disposed above the two weighing hoppers in each set is a single pool hopper $4_i$, giving a total of six pool hoppers which are arranged along a straight line. Provided between the pool hoppers $4_i$ and a device (not shown) for retaining a supply of articles to be weighed are a vibratory feed trough 5 for feeding in the articles from the last-mentioned device, a chute 6 disposed at an incline leading downwardly from the end of the feed trough 5, and vibratory article supply troughs $7_i$ extending from the lower end of the chute 6 to the upper part of respective ones of the pool hoppers $4_i$, the number (6) of the supply troughs $7_i$ being equal to the number of pool hoppers. Articles which have accumulated in the article retaining device are fed in by the feed trough 5, travel along the chute 6 and are supplied to the pool hoppers $4_i$ from the respective supply troughs $7_i$.

Disposed between the pair of weighing hoppers $3_ia$, $3_ib$ in each set and the overlying pool hopper $4_i$ is a director chute $8_i$ (for a total of six director chutes in the illustrated embodiment) so adapted as to be tiltable between a position designating the first weighing hopper $3_ia$ and a position designating the second weighing hopper $3_ib$ in the set. Depending upon the direction in which the director chute $8_i$ is pointed, articles supplied to the corresponding pool hopper $4_i$ are discharged selectively into either the first weighing hopper $3_ia$ or second weighing hopper $3_ib$ upon passing through the corresponding director chute $8_i$ when a gate $40_i$ of the pool hopper $4_i$ is opened.

A single collecting hopper 9 is provided below the the six sets of weighing hoppers $3_ia$, $3_ib$. When gates $30_ia$, $30_ib$ of the respective weighing hoppers $3_ia$, $3_ib$ are opened, the collecting hopper 9 collects the articles discharged from the weighing hoppers and delivers them to a packaging apparatus, not shown).

Thus, each of the sets I through VI comprises the first and second weighing hoppers $3_ia$, $3_ib$, the pool hopper $4_i$ and the director chute $8_i$. Provided for each set is a drive apparatus $10_i$, each of which includes four drive rods $11_i$, $12_i$, $13_i$ and $14_i$ (FIGS. 2 and 3). The first drive rod $11_i$, by being thrust forward from the attitude shown in the drawings, opens the gate $30_ia$ of the first weighing hopper $3_ia$ through a link mechanism $110_i$. Likewise, the second drive rod $12_i$, by being thrust forward from the attitude illustrated, opens the gate $30_ib$ of the second weighing hopper $3_ib$ through a link mechanism $120_i$. Further, the third drive rod $13_i$, by being thrust forward from the attitude illlustrated, opens the gate $40_i$ of the pool hopper $4_i$ through a link mechanism $130_i$. The fourth drive rod $14_i$, when in the retracted position shown in the drawings, tilts the director chute $8_i$ toward the first weighing hopper $3_ia$ through an operating rod $140_i$ and, when thrust forward from the illustrated attitude, tilts the director chute $8_i$ toward the second weighing hopper $3_ib$, i.e., into the attitude shown by the phantom lines, through the operating rod $140_i$.

Reference will be had to FIG. 4 to describe the mechanism through which the drive rod $14_i$ is driven by the drive apparatus $10_i$. The mechanism includes a drive shaft $16_i$ rotated by a motor (not shown) acting through a drive chain (not shown) and a sprocket $15_i$. Mounted on the drive shaft $16_i$ are a drive gear $18_i$ supported rotatably by a bearing $17_i$, and a clutch $19_i$ for selectively engaging the drive gear $18_i$ with the drive shaft $16_i$. A driven gear $21_i$ meshing with the drive gear $18_i$ is rotatably supported through a bearing $23_i$ on a stationary shaft $22_i$ disposed in parallel with the drive shaft $16_i$. Secured to the driven gear $21_i$ by a bolt $24_i$ is a cam plate $25_i$. The arrangement is such that a roller $26_i$ attached to the drive rod $14_i$ is in abutting contact with the outer circumferential surface of the cam plate $25_i$. The drive rod $14_i$ is biased to the left in the illustration at all times by a spring $27_i$. Accordingly, the roller $26_i$ is constantly urged against the outer circumferential surface of the cam plate $25_i$. With such an arrangement, rotating the cam plate $25_i$ causes the drive rod $14_i$, and the operating rod $140_i$ connected to the drive rod, to be reciprocated between the retracted position Z (namely) the attitude indicated by the solid lines), and the projected position Y (namely the attitude shown by the phantom lines). When the drive rod $14_i$ and operating rod $140_i$ are in the retracted position Z, the director chute $8_i$ is pointed toward the first weighing hopper $3_ia$. When the rods are in the projected position Y, the director chute $8_i$ is pointed toward the second weighing hopper $3_ib$.

Mounted on the stationary shaft $22_i$ to oppose the driven gear $21_i$ is a brake $28_i$ for forcibly stopping the rotation of the driven gear $21_i$. Secured to the driven gear $21_i$ by a bolt $31_i$ is an annular light-shielding disk $29_i$ having a centrally provided hole which receives the brake $28_i$. As shown in FIG. 5, the light-shielding disk $29_i$ has a single slit $290_i$. Disposed on the right and left sides of the disk as shown in the drawing are first and second photosensors $31_ia$, $32_ib$, respectively, each comprising, e.g., a light-emitting diode and a phototransistor. The design is such that when the drive rod $14_i$ is situated at the retracted position Z by rotation of the driven gear $21_i$ and cam plate $25_i$, the slit $290_i$ of the light-shielding disk $29_i$ coincides with the position of the first photosensor $32_ia$, and such that when rotation of the driven gear and cam plate brings the drive rod $14_i$ to the projected position Y, the slit $290_i$ coincides with the position of the second photosensor $32_ib$.

It should be noted that the drive rods $13_i$, $11_i$ and $12_i$ for opening and closing the gates $40_i$, $30_ia$ and $30_ib$ of the pool hopper $4_i$ and weighing hoppers $3_ia$, $3_ib$, respectively, are driven by mechanisms similar to that shown in FIG. 4. These mechanisms are accommodated within the drive apparatus $10_i$ and each is driven by the same drive shaft, namely the drive shaft $16_i$.

Figure 6:
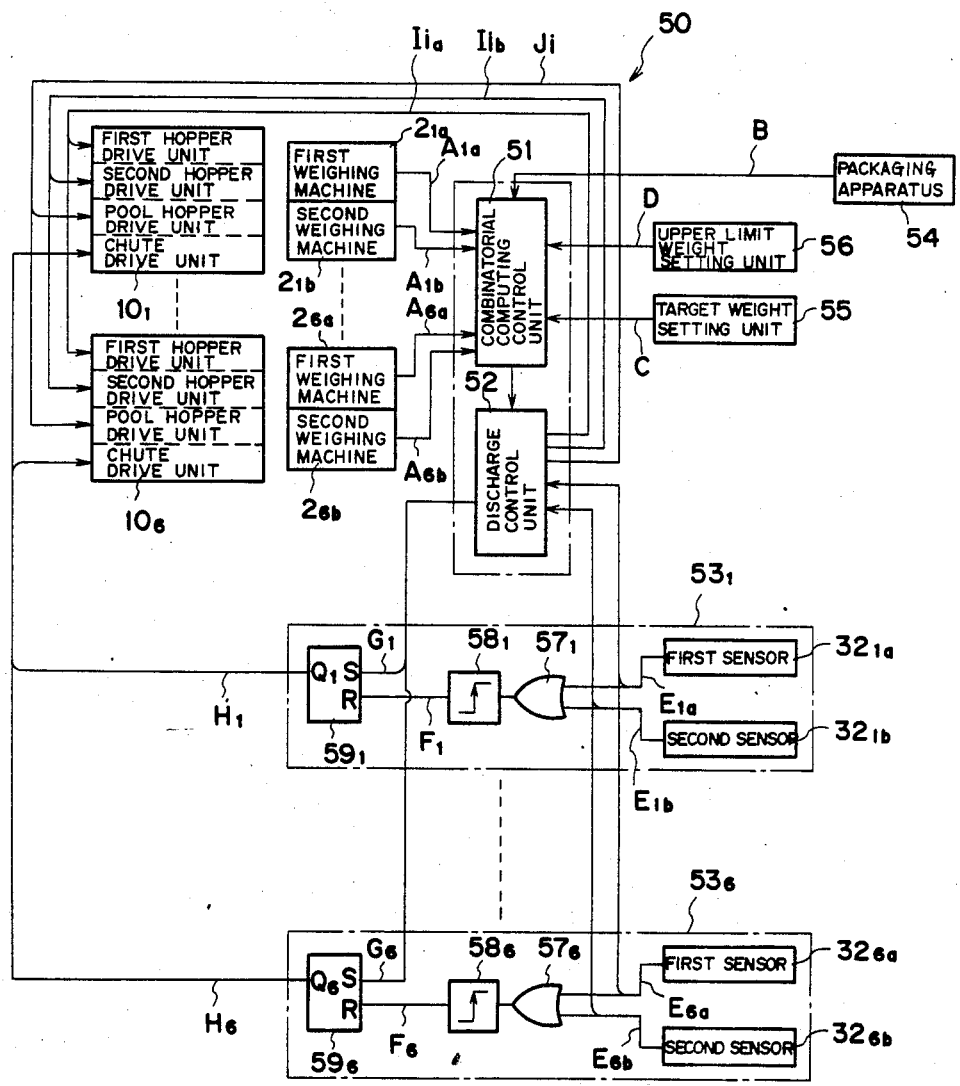

Described next in conjunction with FIG. 6 is a control apparatus for actuating the drive apparatus $10_i$ to control the open/close operation of the gates of the weighing hoppers $3_ia$, $3_ib$ and pool hopper $4_i$, as well as a changeover operation to change the direction in which the director chute $8_i$ is tilted.

The control apparatus, indicated at numeral 50, includes a combinatorial computing control unit 51, a discharge control unit 52, and drive control units $53_i$ ($53_1$ through $53_6$) for operating each drive apparatus $10_i$ ($10_1$ through $10_6$). The inputs to the combinatorial computing control unit 51 are weight signals $A_ia$, $A_ib$ from the respective first and second weighing machines $2_ia$, $2_ib$ in each set, a timing signal B received intermittently from a packaging apparatus 54 at a prescribed time interval, as well as a target weight signal C and upper limit weight signal D from a target weight setting unit 55 and an upper limit weight setting unit 56, respectively. The results of computations performed by the combinatorial computing control unit 51 are delivered to the discharge control unit 52.

Each drive control unit $53_i$ comprises first and second photosensors $32_ia$ ($32_1a$ through $32_6a$) and $32_ib$ ($32_1b$ through $32_6b$), an OR circuit $57_i$ ($57_1$ through $57_6$) for receiving signals $E_ia$ ($E_1a$ through $E_6a$) and $E_ib$ ($E_1b$ through $E_6b$) produced by the photosensors $32_ia$, $32_ib$, respectively, a differentiating circuit $58_i$ ($58_1$ through $58_6$) which receives the output of the OR circuit $57_i$, and a flip-flop circuit $59_i$ ($59_1$ through $59_6$) which receives the signal $E_ia$ or $E_ib$ as a reset signal $F_i$ ($F_1$ through $F_6$) through the action of the differentiating circuit $58_i$. The output signals $E_ia$, $E_ib$ of the first and second photosensors $32_ia$, $32_ib$ are also applied to the discharge control unit 52 as chute position signals indicating the position of the director chute $8_i$. The discharge control unit 52 delivers a set signal $G_i$ ($G_1$ through $G_6$) to the flip-flop circuit $59_i$. After the application of the set signal $G_i$, and until the application of the reset signal $F_i$, the flip-flop circuit $58_i$ delivers a chute drive signal $H_i$ ($H_1$ through $H_6$) to a chute drive unit in the corresponding drive apparatus $10_i$. The discharge control unit 52 also delivers first and second weighing hopper opening signals $I_ia$, $I_ib$, and a pool hopper opening signal $J_i$, to first and second weighing hopper drive units and a pool hopper drive unit, respectively, constituting the drive apparatus $10_i$.

Figure 7:
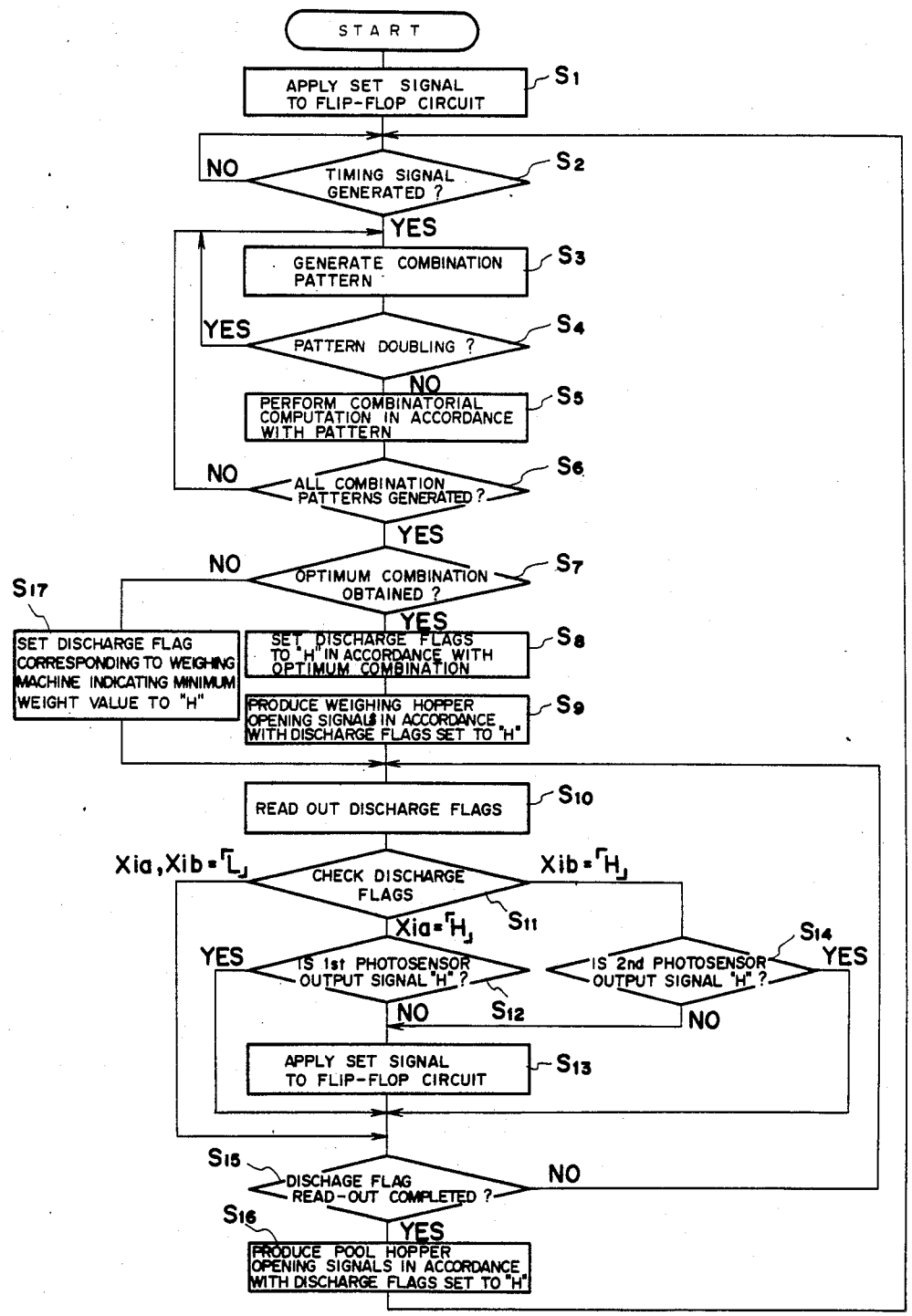

The operation of the first embodiment of the present invention will now be described with reference to the flowchart of FIG. 7.

First, by introducing electric power to the apparatus, the discharge control unit 52 in the control apparatus 50 produces the set signal $G_i$ applied to the flip-flop circuit $59_i$ of the corresponding drive control unit $53_i$. In response to the set signal $G_i$, the flip-flop circuit $59_i$ delivers the drive signal $H_i$ to the chute drive unit of the corresponding drive apparatus $10_i$, in response to which the clutch $19_i$ in the drive apparatus $10_i$ is actuated to engage the drive gear $18_i$ with the drive shaft $16_i$. This causes the cam plate $25_i$ to be rotated through the driven gear $21_i$, whereby the drive rod $14_i$ is thrust forward or retracted to tilt the director chute $8_i$. At the instant the director chute $8_i$ is pointing at the first or second weighing hopper $3_ia$ or $3_ib$, the slit $290_i$ of the light-shielding disk $29_i$, which rotates in unison with the cam plate $25_i$, will coincide with the position of the first or second photosensor $32_ia$ or $32_ib$, causing the particular photosensor to issue the chute position signal $E_ia$ or $E_ib$, whereby the reset signal $F_i$ is applied to the flip-flop circuit $59_i$ through the differentiating circuit $58_i$. In consequence, in the drive apparatus $10_i$, the clutch $19_i$ is disengaged to interrupt the transmission of rotating force to the drive gear $18_i$, and the brake $28_i$ is applied to halt the rotation of the driven gear $21_i$ and, hence, of the cam plate $25_i$. The drive rod $14_i$ contacting the cam plate $25_i$ through the roller $26_i$ therefore comes to rest at the retracted position Z, where the director chute $8_i$ tilts toward the first weighing hopper $3_ia$, or at the projected position Y, where the director chute $8_i$ tilts toward the second weighing hopper $3_ib$. The foregoing operations correspond to step S1 of the flowchart.

Next, in steps S2 through S5, the combinatorial computing control unit 51 of the control apparatus 50 successively generates a total of 4095 ($2^{12}-1$) combination patterns, shown in FIG. 8, of the 12 weighing machines $2_ia$, $2_ib$ upon receiving the timing signal B from the packaging apparatus 54. As each pattern is generated, it is determined (step S4) whether the pattern includes two weighing machines $2_ia$, $2_ib$ from the same set, i.e., whether doubling has occurred in the combination pattern. If it has, the next pattern is generated; if not, then a combinatorial computation is performed with respect to the weighing machines 2 . . . 2 corresponding to the pattern. Thus, steps S2 through S5 exclude patterns which select two weighing machines from the same set simultaneously.

In the illustrated embodiment, the generation of the combination patterns in step S3 takes place 4095 times in a weighing cycle. It should be noted, however, that the combinatorial computations are performed only with regard to the patterns in which doubling does not occur, or a total of 728 times in a weighing cycle. This reduces computation time. Further, though the above-described procedure wherein the two weighing machines $2_ia$, $2_ib$ in the same set are not selected in a combination pattern is the procedure preferred, it is permissible to adopt an arrangement in which two weighing machines from the same set may be selected at the same time. However, for the sake of simplifying the description, the invention will be described hereinafter based on the aforementioned preferred procedure only.

In the combinatorial computation mentioned above, the weight values indicated by the weight value signals A . . . A from the weighing machines 2 . . . 2 corresponding to a combination pattern are added, the difference is found between the resulting sum and the target value indicated by the target weight signal C from the target weight setting unit 55, the difference found is successively compared with differences obtained from subsequent combinatorial computations and, when all patterns have been generated, the combination pattern giving the smallest difference is selected. This corresponds to step S6 of the flowchart. Then, in step S7, if the sum of the weight values in the selected combination is appropriate in view of the value indicated by the upper limit weight signal D from the upper limit weight setting unit 56, this combination is judged determined to be the optimum combination.

Twelve discharge flags $X_ia$, $X_ib$ are provided for corresponding ones of the 12 weighing machines $2_ia$, $2_ib$, (weighing hoppers $3_ia$, $3_ib$). When the optimum combination pattern is selected in the foregoing manner, those discharge flags X . . . X which correspond to the optimum combination pattern are set to the H (high) level, as illustrated in the example of FIG. 9. Then, in accordance with the discharge flags X . . . X set to the H level, the discharge control unit 52 delivers the first and second hopper opening signals I . . . I to the corresponding first and second weighing hopper drive units of the drive apparatus $10_i$. The foregoing operations correspond to steps S8 and S9 of the flowchart. As a result of these operations, the gates of the weighing hoppers 3 . . . 3 corresponding to the optimum combination are opened, so that the articles contained in these weighing hoppers are released into the collecting chute 9. This batch of collected articles, the weight whereof is equal or closest to the target weight within preset allowable limits, is supplied to the packaging apparatus.

During the discharge of the articles from the weighing hoppers 3 . . . 3 into the chute 9, the control apparatus 50 reads out the discharge flags $X_ia$, $X_ib$ set by set, starting from the first set $X_1a$, $X_1b$, and checks the H, L levels of the flags. These are the steps S10, S11 in the flowchart. If, as shown in FIG. 9, $X_1a$ is at the H level and $X_1b$ at the L level in the first set, i.e., if the first weighing hopper $3_1a$ participates in the optimum combination and, hence, has discharged its articles, then the logic level of the output signal (chute position signal) $E_1a$ from the first photosensor $32_1a$ in the drive control unit $53_1$ is checked (step S12). When the signal $E_1a$ is at the L level, namely when the director chute $8_1$ is not tilted toward the first weighing hopper $3_1a$, the discharge control unit 52 delivers the set signal $G_1$ to the flip-flop circuit $59_1$ (step S13). As a result, the chute drive unit of the drive apparatus $10_1$ is actuated by the drive signal $H_1$ from the flip-flop circuit $59_1$, and the chute drive unit operates the director chute $8_1$, causing the director chute to tilt toward the first weighing hopper $3_1a$. At this instant, the output signal $E_1a$ of the first photosensor $32_1a$ attains the H level, thereby applying the reset signal $F_1$ to the flip-flop circuit $59_1$, in response to which the operation of the director chute $8_1$ is halted. In this case, if the director chute $8_1$ is pointing toward the first weighing hopper $3_1a$ from the beginning, the output signal $E_1a$ of the first photosensor $32_1a$ will be at the H level, so that the set signal $G_1$ for operating the director chute $8_1$ is not produced.

As regards to the second set where, in the illustrated example, discharge flag $X_2a$ is at the L level and discharge flag $X2_b$ is at the H level, i.e., where the second weighing hopper $3_2a$ participates in the optimum combination and, hence, has discharged its articles, the system moves from step S11 to a step S14, which is for checking the logic level of the output signal $E_2b$ from the second photosensor $32_1b$ in the drive control unit $53_2$. Then, as described above with regard to the first set, the set signal $G_2$ is produced when the director chute $8_2$ is not pointing toward the second weighing hopper $3_2b$. In response to this signal, the director chute $8_2$ is tilted in the opposite direction, i.e., toward the second weighing hopper $3_2b$. In a case where the discharge flags $X_ia$, $X_ib$ are both at the L level, the output signals $E_ia$, $E_ib$ of the photosensors $32_ia$, $32_ib$ are not checked, and the direction in which the director chute $8_i$ is pointing is not changed.

When all of the discharge flags $X_ia$, $X_ib$ are thus checked and the directior chute $8_i$ in each set is tilted toward the weighing hopper which has discharged its articles, the discharge control unit 52, in accordance with the L, H levels of the discharge flags $X_ia$, $X_ib$, delivers the pool hopper opening signal $J_i$ to the pool hopper drive unit of the drive apparatus $10_i$. These operations correspond to steps S15 and S16. If either of the discharge flags $X_ia$, $X_ib$ in each set is at the H level, the pool hopper opening signal $J_i$ is delivered to the drive apparatus $10_i$ for that set. This causes the gate $40_i$ of the corresponding pool hopper $4_i$ to open, so that articles for the next weighing cycle are supplied through the director chute $8_i$ to the weighing hoppers 3 . . . 3 that have discharged their articles. Accordingly, since the two weighing hoppers $3_ia$, $3_ib$ in each set never discharge articles simultaneously, all of the weighing hoppers that have discharged their articles are supplied with articles by a single supply operation performed by the pool hoppers $4_i$.

When a negative decision is rendered in step S7, indicating that an optimum combination has not been obtained because, for example, the upper limit weight has been exceeded, processing shifts to a step S17. According to step S17, none of the weighing hoppers discharge their articles, and only the discharge flag X correponding to the weighing machine 2 giving the smallest weight value is set to the H level. Then, steps S10 through S16 are performed, wherein either the director chute 8 is tillted toward the weighing hopper 3 corresponding to the above mentioned discharge flag X, or the corresponding pool hopper 4 is opened upon confirming that the director chute 8 is already pointing toward said weighing hopper. Thus, the weighing hopper 3 giving the smallest weight value is provided with an additional amount of the articles, and a combinatorial computation is performed again using weight data which are now different because of the changed weight value of the supplemented weighing hopper.

FIG. 10 is a schematic view of an example in which the apparatus of the first embodiment is applied to an automatic weighing system of the type having a dispersing bowl 102 for dispersing articles to be weighed. The article supply apparatus in this application includes the dispersing bowl 102, which has a disk-shaped configuration provided with a plurality of openings $102a$ . . . $102a$, and which is disposed below a chute 101 through which the articles drop, a plurality of pool hoppers 104 . . . 104 which are supplied with articles from corresponding ones of the openings $102a$ . . . $102a$ via corresponding gates 103 . . . 103, weighing hoppers $105a$, $105b$ . . . $105a$, $105b$ arranged in sets of two weighing hoppers each, with each set being disposed below a corresponding one of the pool hoppers 104 . . . 104, and a director chute 106 disposed betweeen each pool hopper 104 and the corresponding set of two weighing hoppers $105a$, $105b$. The director chute is adapted so as to tilt selectively toward the weighing hopper $105a$ or $105b$ in the set, whereby the articles from the pool hopper 104 are selectively supplied to the weighing hopper $105a$ or $105b$.

In the above application, the dispersing bowl 102 is provided at the center of the apparatus, and the articles are supplied from the dispersing bowl 102 to each of the pool hoppers. However, the invention is not limited to this arrangement. For example, the invention can be applied to an arrangement disclosed in U.S. Pat. No. 4,398,612, in which there is a centrally disposed dispersing table and a plurality of radially arranged troughs surrounding the dispersing table. With such a configuration, articles supplied to the dispersing table are fed into the pool hoppers through corresponding ones of the troughs.

Figure 11:
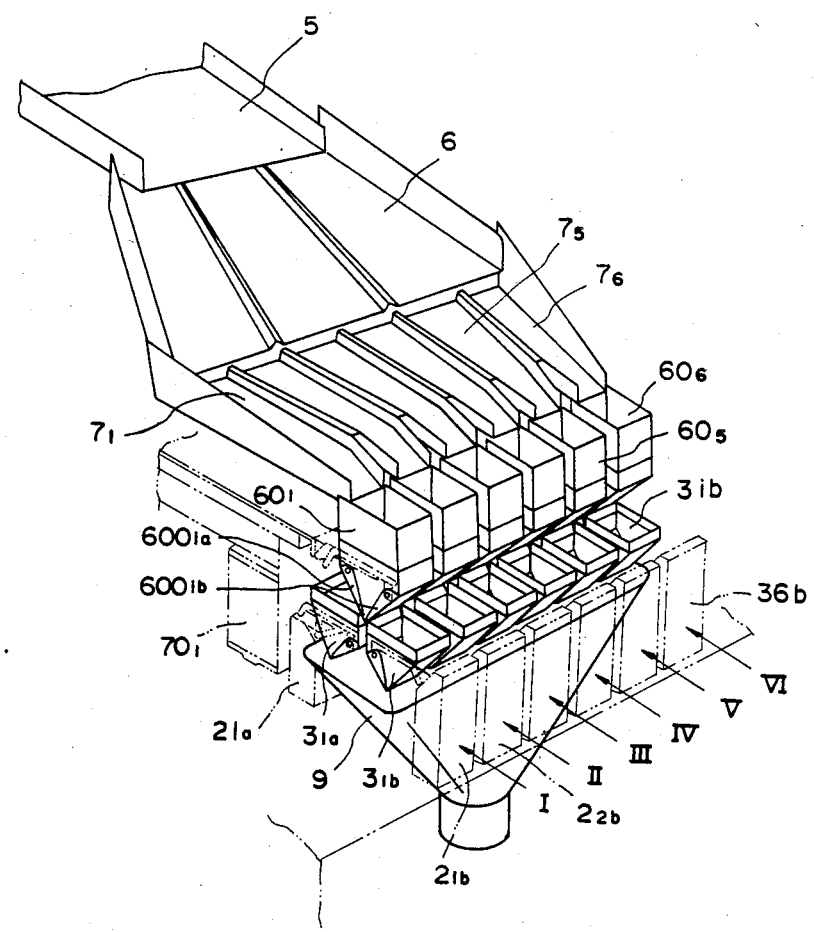

Next, a second embodiment of an article supply apparatus according to the present invention will be described with reference to FIGS. 11 through 13.

As in the first embodiment, the article supply apparatus includes the 12 weighing machines $2_ia$, $2_ib$ mounted on the base 1 in six sets of two weighing machines each, as well as the first and second weighing hoppers $3_ia$, $3_ib$ corresponding to the weighing machines $2_ia$, $2_ib$. Disposed above the two weighing hoppers in each set is a single pool hopper $60_i$, giving a total of six pool hoppers which are arranged. Provided between the pool hoppers $60_i$ and the device (not shown) for retaining a supply of articles are a vibratory feed trough 5 for feeding in the articles from the device, the chute 6 disposed at an incline leading downwardly from the end of the feed trough 5, and the vibratory article supply troughs $7_i$ extending from the lower end of the chute 6 to the upper part of respective ones of the pool hoppers $60_i$. The collecting chute 9 is disposed below the weighing hoppers $3_ia$, $3_ib$. The construction described so far is identical to that of the first embodiment.

The characterizing feature of the article supply apparatus according to the second embodiment of the invention resides in the fact that each pool hopper $60_i$ is equipped with first and second gates $610_ia$, $610_ib$, corresponding to the pair of underlying first and second weighing hoppers $3_ia$, $3_ib$. When either of the first and second gates $610_ia$, $610_ib$ is opened, the articles contained in the pool hopper thereof are supplied to the first or second weighing hopper, namely the weighing hopper corresponding to the open gate.

Figure 12:
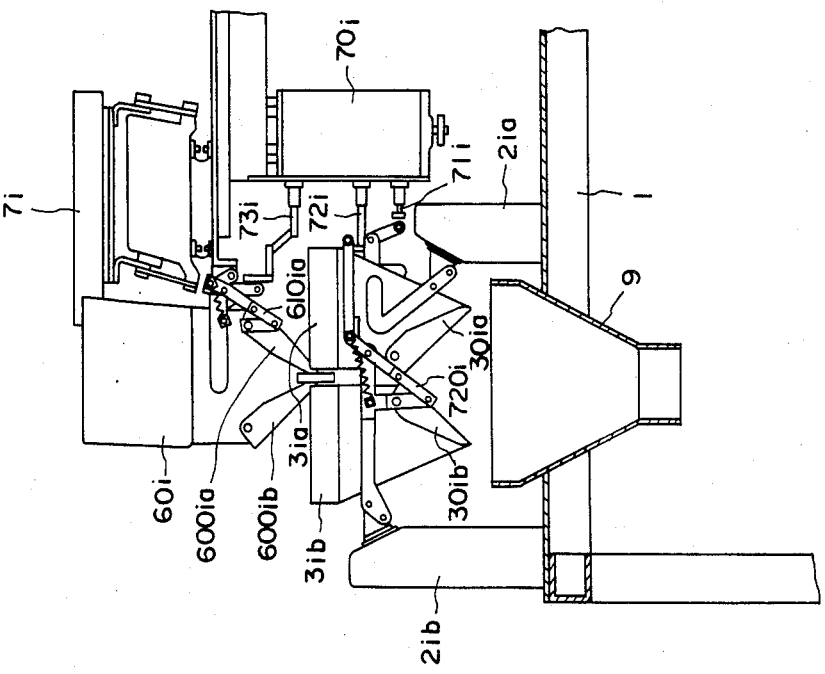
Figure 13:
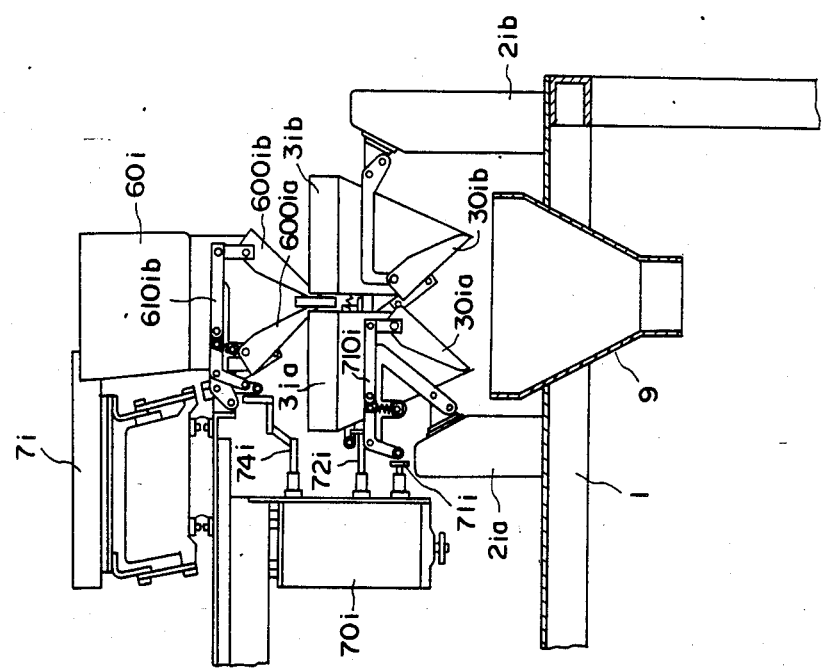

Provided for each set is a drive apparatus $70_i$, each of which includes four drive rods $71_i$, $72_i$, $73_i$ and $74_i$ (FIGS. 12 and 13). The first drive rod $71_i$, by being thrust forward from the attitude shown in the drawings, opens the gate $30_ia$ of the first weighing hopper $3_ia$ through a link mechanism $710_i$. Likewise, the second drive rod $72_i$, by being thrust forward from the attitude illustrated, opens the gate $30_ib$ of the second weighing hopper $3_ib$ through a link mechanism $720_i$. This arrangement is similar to that of the first embodiment. In the second embodiment, however, the third drive rod $73_i$, by being thrust forward from the attitude illustrated, opens the first gate $600_ia$ of the pool hopper $60_ia$ through a link mechanism $610_i$. The fourth drive rod $74_i$, by being thrust forward from the attitude illustrated, opens the second gate $600_ib$ of the pool hopper $60_ia$ through a link mechanism $610_ib$.

Figure 14:
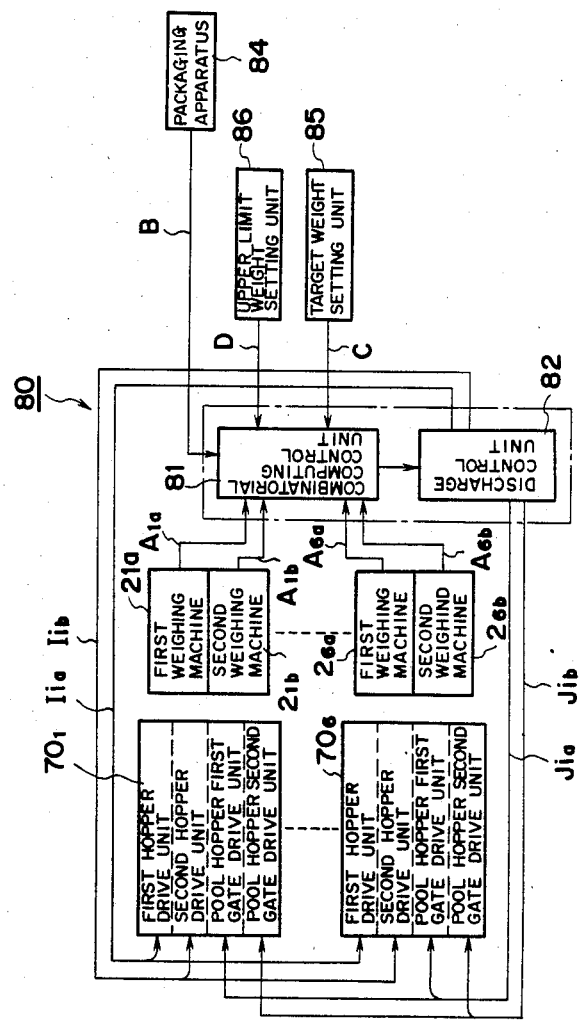

Reference will now be had to FIG. 14 to described the control apparatus for controlling the operation of the drive apparatus $70_i$.

The control apparatus, indicated at numeral 80, includes a combinatorial computing control unit 81 and a discharge control unit 82. The inputs to the combinatorial computing control unit 81 are weight signals $A_ia$, $A_ib$ from the respective first and second weighing machines $2_ia$, $2_ib$ in each set, a timing signal B received from a packaging apparatus 84, as well as a target weight signal C and upper limit weight signal D from a target weight setting unit 85 and upper limit weight setting unit 86, respectively. On the basis of computed results received from the combinatorial computing control unit 81, the discharge control unit 82 delivers first and second weighing hopper opening signals $I_ia$, $I_ib$ to first and second weighing hopper drive units, respectively, in the drive apparatus $70_i$, and delivers first and second gate opening signals $J_ia$, $J_ib$ to pool hopper first and second gate drive units, which are also provided in the drive apparatus $70_i$.

The operation of the control apparatus will now be described with reference to the flowchart of FIG. 15.

Figure 15:
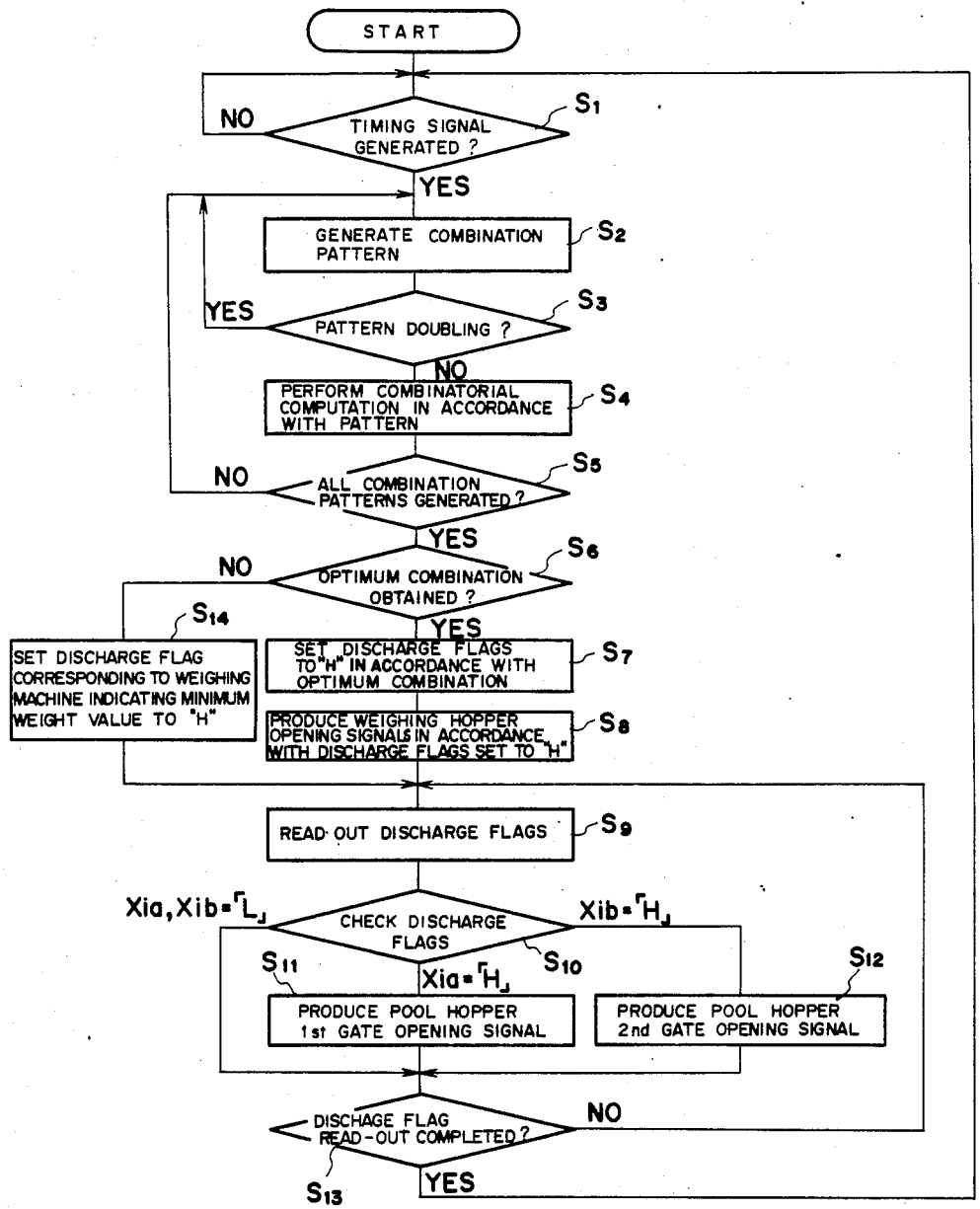

As in the first embodiment of the present invention, combination patterns of the weight values from each of the weighing machines $2_ia$, $2_ib$ are generated in response to the timing signal B from the packaging apparatus, combinatorial computations are performed with regard to those combinations in which doubling does not occur in the patterns thereof, and an optimum combination is obtained (steps S1 through S6 of the flowchart in FIG. 15). Among the discharge flags $X_ia$, $X_ib$, those flags corresponding to the optimum discharge pattern are set to the H level, and the weighing hopper opening signals I . . . I are delivered to the first and second weighing hopper drive units of the drive apparatus $70_i$ to open the weighing hoppers 3 . . . 3 that correspond to the flags X . . . X set to the H level (steps S7, S8). As a result of these operations, the weighing hoppers 3 . . . 3 corresponding to the optimum combination are opened to provide a batch of the articles having a weight equal or closest to the target weight.

During the discharge of the articles from the weighing hoppers 3 . . . 3, the control apparatus 80 reads out the discharge flags $X_ia$, $X_ib$ set by set starting from the first set $X_1a$, $X_1b$, and checks the H, L levels of the flags. These are the steps S9, S10 in the flowchart. If $X_1a$ is at the H level and $X1_b$ is at the L level in the first set, the first gate opening signal $J_1a$ for opening the first gate $600_1a$ of the pool hopper $60_1$ is delivered to the drive apparatus $70_1$ (step S11). If $X_2a$ is at the L level and $X_2b$ is at the H level in the second set, the second gate opening signal $J_2b$ for opening the second gate $600_2a$ of the pool hopper $60_2$ is delivered to the drive apparatus $70_2$ (step S12). Further, where the discharge flags $X_ia$, $X_ib$ are both at the L level, the gate opening signal J is not produced and the next combination is checked (step S13). Thus, articles for the next weighing cycle are supplied from the pool hoppers 60 . . . 60 corresponding to the weighing hoppers 3 . . . 3 that have discharged their articles. Since the two weighing hoppers $3_ia$, $3_ib$ in each set never discharge articles simultaneously, all of the weighing hoppers that have discharged their articles are supplied with articles by a single supply operation, irrespective of the fact that only one pool hopper is provided for each set of two weighing hoppers.

When an optimum combination is not obtained in step S6, processing proceeds as described eaarlier in connection with the first embodiment. Specifically, in step S14, the discharge flag X corresponding to the weighing machine 2 giving the smallest weight value is set to the H level. Then, steps S9 through S13 are performed, wherein an additional supply of articles is provided from the gate 600 of the pool hopper 60 corresponding to the weighing hopper 3 of the weighing machine which previously gave the smallest weight value.

FIG. 16 is a schematic view of an example in which the apparatus of the second embodiment is applied to the automatic weighing system of the type having the dispersing bowl 102 for dispersing articles to be weighed. The article supply apparatus in this application includes the dispersing bowl 102, which has a disk-shaped configuration provided with the plurality of openings 102a... 102a, and which is disposed below the chute 101 through which the articles drop, a plurality of pool hoppers 107... 107 which are supplied with articles from corresponding ones of the openings 102a... 102a via corresponding gates 103... 103, each pool hopper 107 having two gates 107a, 107b, and the weighing hoppers 105a, 105b... 105a, 105b arranged in sets of two weighing hoppers each, with each set being disposed below a corresponding one of the pool hoppers 107... 107. When the gate 107a of the pool hopper 107 is opened, the articles contained in the pool hopper 107 are supplied to the weighing hopper 105a. On the other hand, opening the gate 107b supplies the articles to the weighing hopper 105b.

In the above application, the dispersing bowl 102 is provided at the center of the apparatus, and the articles are supplied from the dispersing bowl 102 to each of the pool hoppers. However, the invention is not limited to this arrangement. For example, the invention can be applied to the above-described arrangement disclosed in U.S. Pat. No. 4,398,612, in which there is a centrally disposed dispersing table and a plurality of radially arranged troughs surrounding the dispersing table. With such a configuration, articles supplied to the dispersing table are fed into the pool hoppers through corresponding ones of the troughs.

As many apparently widely different embodiments of the present invention can be made without departing from the spirit and scope thereof, it is to be understood that the invention is not limited to the specific embodiments thereof except as defined in the appended claims.

What we claim is:

1. A method of supplying articlles to be weighed in an automatic weighing system having plural weighing hopper sets each of which includes a pair of weighing hoppers attached to respective ones of plural weighing machines, a pool hopper and a director chute provided for the pair of weighing hoppers in each weighing hopper set, a drive apparatus provided for each weighing hopper set for operating the corresponding pool hopper and the corresponding director chute to selectively supply articles from the pool hopper and the director chute to the pair of weighing hoppers in the weighing hopper set, and a control apparatus for controlling the drive apparatus, said method comprising the steps of:

(a) computing combinations by means of the control apparatus on the basis of weight values from the plurality of weighing machines;

(b) discharging articles from selected weighing hoppers in response to a first command sent from the control apparatus to the drive apparatus for each weighing hopper set which includes one of the selected weighing hoppers forming a part of an optimum combination from the optimum combinations computed in said step (a), by causing the drive apparatus to open the selected weighing hoppers which correspond to the optimum combination;

(c) selectively sending a tilt command from the control apparatus to the drive apparatus for each weighing hopper set which includes one of the selected weighing hoppers to cause the drive apparatus to tilt only the director chutes corresponding to the weighing hopper sets from which articles have been discharged, toward the corresponding selected weighing hoppers; and (d) supplying articles from the pool hoppers to the corresponding selected weighing hoppers which have discharged their articles, in response to a second command sent from the control apparatus to the drive apparatus, the second command causing the drive apparatus for the weighing hopper sets which include one of the selected weighing hoppers to open only the pool hoppers corresponding to the weighing hopper sets from which articles have been discharged.

2. An apparatus for supplying articles to be weighed in an automatic weighing system for selecting an optimum combination by performing a combinatorial computation based on weight values from a plurality of weighing machines having corresponding weighing hoppers attached thereto, and for discharging articles by opening only the gates of weighing hoppers which correspond to the optimum combination, said apparatus comprising:

plural weighing hopper sets, each of which includes a pair of weighing hoppers attached to respective ones of the plural weighing machines, each of the weighing hoppers having a gate;

pool hoppers respectively disposed above the respective pairs of weighing hoppers in said weighing hopper sets, each of said pool hoppers having a gate;

director chutes respectively disposed between the respective weighing hopper sets and the corresponding ones of said pool hoppers, each of said director chutes being selectively tiltable toward either one of the pair of weighing hoppers in the corresponding one of said weighing hopper sets;

drive means for operating the gate of each of said weighing hoppers, the gate of each of the pool hoppers and each of said director chutes; and control means for controlling operation of said drive means in such a manner that, when a weighing hopper is a part of the selected optimum combination on the basis of the weight values from the plurality of weighing machines, the director chute corresponding to the weighing hopper set containing said selected weighing hopper is selectively tilted toward said selected weighing hopper, and the gate of said pool hopper corresponding to said selected weighing hopper set, is opened.

3. The apparatus according to claim 2, wherein sets comprising the pair of weighing hoppers, the single pool hopper disposed above the pair of weighing hoppers, and the director chute disposed between the pair of weighing hoppers and said pool hopper, are arranged along a straight line.

4. The apparatus according to claim 2, wherein sets comprising the pair of weighing hoppers, the single pool hopper disposed above the pair of weighing hoppers, and the director chute disposed between the pair of weighing hoppers and said pool hopper, are arranged in a circle.

5. An apparatus for supplying articles to be weighed in an automatic weighing system for selecting an optimum combination by performing a combinatorial computation based on weight values from a plurality of weighing machines having corresponding weighing hoppers attached thereto, and for discharging articles by opening only the gates of weighing hoppers which correspond to the optimum combination, said apparatus comprising:

plural weighing hopper sets, each of which includes a pair of weighing hoppers attached to respective ones of the plural weighing machines, each of the weighing hoppers having a gate;

pool hoppers respectively disposed above the respective pairs of weighing hoppers in said weighing hopper sets, each of said pool hoppers having two gates facing corresponding ones of the weighing hoppers in the corresponding pair of weighing hoppers;

drive means for operating the gate of each of said weighing hoppers and the two gates of each of said pool hoppers; and control means for computing combinations based on the weight values from the plurality of weighing machines, and for controlling operation of said drive means in such a manner that, when one of the two weighing hoppers in a weighing hopper set is selected as a part of an optimum combination, only the one of the two pool hopper gates which faces the selected weighing hopper corresponding to the optimum combination, is opened.

6. The apparatus according to claim 5, wherein sets comprising the pair of weighing hoppers and the single pool hoppers disposed above the pair of weighing hoppers are arranged along a straight line.

7. The apparatus according to claim 5, wherein sets comprising the pair of weighing hoppers and the single pool hopper disposed above the pair of weighing hoppers are arranged in a circle.

8. A combinatorial weighing apparatus comprising:

a plurality of means for supplying and weighing batches of articles and for generating weight values corresponding to each of the weighed batches of articles, each of said plural supplying and weighing means including:

a pool hopper for temporarily storing a batch of articles to be weighed, said pool hopper having first and second gates which open along first and second discharge paths, respectively;

a first weighing hopper positioned below the first gate of said pool hopper in the first discharge path, said first weighing hopper having a gate; and a second weighing hopper positioned below the second gate of said pool hopper along the second discharge path, said second weighing hopper having a gate;

drive means for operating the gate of each of said first and second weighing hoppers and for operating the first and second gates of each of said pool hoppers; and control means for performing combinatorial computation based on the weight values generated by the plurality of supplying and weighing means, and for controlling the operation of said drive means so that only when one of said first and second weighing hoppers in one of said plurality of supplying and weighing means, is selected as a part of an optimum combination, said drive means opens only the corresponding one of the first and second pool hopper gates which is disposed above the selected one of the first and second weighing hoppers.

9. A combinatorial weighing apparatus as set forth in claim 8, wherein said control means includes means for determining whether a particular combination of weighing hoppers includes the first and second weighing hoppers from one of said plurality of supplying and weighing means, said control means performing combinatorial computation for only those combinations which do not include both the first and second weighing hoppers from one of the plurality of supplying and weighing means.

10. A method of supplying articles to be weighed in an automatic weighing system having plural weighing hopper sets each of which includes a pair of weighing hoppers attached to respective ones of plural weighing machines, a pool hopper disposed above the pair of weighing hoppers in each weighing hopper set, each of the pool hoppers having two gates respectively positioned facing corresponding ones of the weighing hoppers in each of the pairs of weighing hoppers, a drive apparatus provided for each weighing hopper set for operating the corresponding pool hopper to selectively supply articles from the pool hopper to the pair of weighing hoppers in the weighing hopper set, and a control apparatus for controlling the drive apparatus, said method comprising the steps of:

(a) computing combinations by means of the control apparatus on the basis of weight values from the plurality of weighing machines;

(b) discharging articles from selected weighing hoppers in response to a first command sent from the control apparatus to the drive apparatus corresponding to the selected weighing hoppers, causing the selected drive apparatus to open the selected weighing hoppers which correspond to an optimum combination from the combinations computed in said step (a); and (c) supplying articles from the pool hoppers to the corresponding weighing hoppers which have discharged their articles, in response to a second command sent from the control apparatus to the drive apparatus corresponding to the selected weighing hoppers, the second command causing the selected drive apparatus to open only the one of the gates of each of the pool hoppers which faces a corresponding weighing hopper from which articles have been discharged.

* * * * *

UNITED STATES PATENT AND TRADEMARK OFFICE
CERTIFICATE OF CORRECTION

PATENT NO. : 4,678,047

DATED : JULY 7, 1987

INVENTOR(S) : KOICHI KATAOKA ET AL.

It is certified that error appears in the above-identified patent and that said Letters Patent is hereby corrected as shown below:

FRONT PAGE [73] line 1, "Saisha" should be --Kaisha--.

Col. 3, line 8, "an explanatory view of" should be --a table for explaining--.

Col. 4, line 8, "apparatus, not" should be --apparatus (not--;
line 35, "15i." should be --$15_i$.--;

line 47, "27i." should be --$27_i$.--;

line 52, "(namely)" should be --(namely--;

line 56, "8i" should be --$8_i$--;

line 68, "$31_i$a," should be --$32_i$a,--.

Col. 6, line 1, "53i." should be "$53_i$.--.

Col. 7, line 6, delete "judged";
line 50, "flop-flop" should be --flip-flop--.

Col. 9, line 59, "described" should be --describe--.

UNITED STATES PATENT AND TRADEMARK OFFICE
CERTIFICATE OF CORRECTION

PATENT NO. : 4,678,047

DATED : JULY 7, 1987

INVENTOR(S) : KOICHI KATAOKA ET AL.

It is certified that error appears in the above-identified patent and that said Letters Patent is hereby corrected as shown below:

Col. 10, line 60, "eaarlier" should be --earlier--.

Col. 11, line 40, "articlles" should be --articles--.

Signed and Sealed this

Twenty-ninth Day of March, 1988

Attest:

DONALD J. QUIGG

*Attesting Officer*  *Commissioner of Patents and Trademarks*